Dec. 10, 1968        W. E. SCOTT        3,415,248
SYRINGE NOZZLE
Filed May 3, 1966
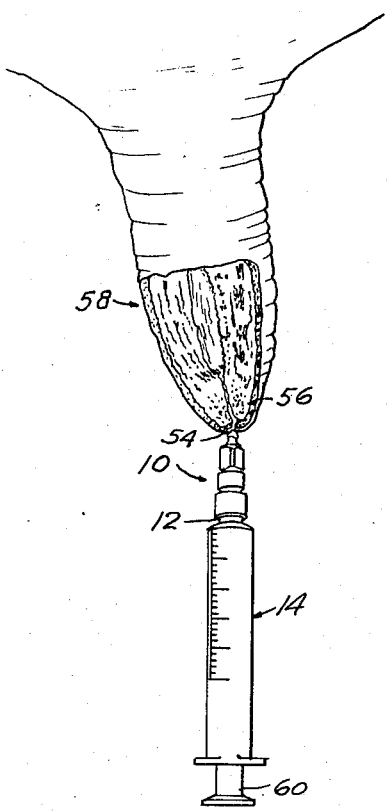
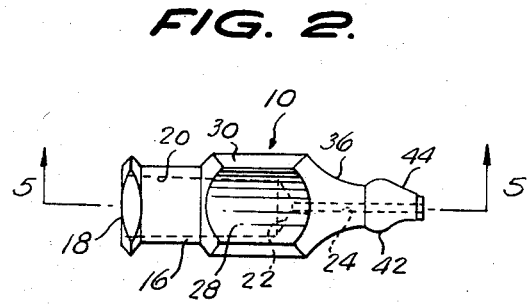
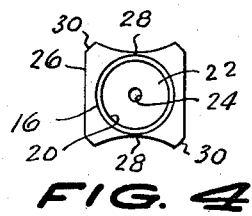
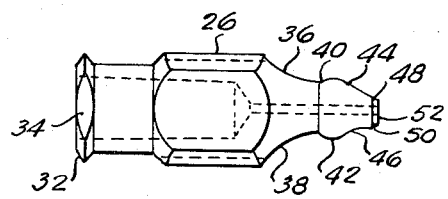
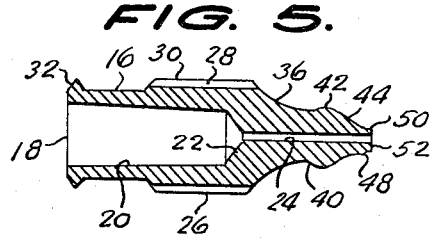
INVENTOR.
WALDO E. SCOTT,
BY
Berman, Davidson & Berman
ATTORNEYS.

United States Patent Office 3,415,248
Patented Dec. 10, 1968

3,415,248
SYRINGE NOZZLE
Waldo E. Scott, R.F.D. 3, Kenton, Ohio 43326
Filed May 3, 1966, Ser. No. 547,256
7 Claims. (Cl. 128—245)

ABSTRACT OF THE DISCLOSURE

A self-sealing nozzle to be used with an injection syringe for injecting medication into an animal teat. The nozzle consists of a tapered body having a large rear bore portion adapted to fit on the neck of a standard injection syringe. A reduced forward bore portion leads to the small end of the body. At its small end the body is provided with a short cylindrical tip having a flat annular sealing surface adapted to be pressed into the muscle ring surrounding the animal teat to act as a mechanical seal.

---

This invention relates to syringes, and more particularly to a nozzle, for use on standard or other syringes, for the internal application of medicament to the udders of animals through teats thereof.

In the treatment of animal udder infections grouped under the term "mastitis," it is customary to inject antibiotics into the udder, through teats, the injection involving passing a syringe nozzle deeply through a teat and discharging the medicament into the udder. This is accompanied by some pain, especially where the areas contacted are sore, and by the probable injection of further bacteria, militating against sanitation; and after such injection it is necessary to massage the teat manually to effect distribution of the medicament, and to prevent the medicament from leaking back out of the teat, again risking the spread and introduction of bacteria.

Further, the deep penetration of the nozzle mentioned above, besides irritating the lining of the teat and surrounding tissues, both internal and external, by-passes application of medicament directly to the interior of the teat, so that infection residing in the teat is wholly or partially neglected, so that the medication of the udder can be undone by the infection remaining in the teat.

The primary object of the present invention is the provision of a nozzle, of either permanent or throw-away character, adapted for use with standard syringes, the use of which eliminates or substantially reduces all of the above-outlined drawbacks, by providing for no more than indenture of the outer end of the teat, while at the same time effectively sealing the nozzle relative to the teat passage, against the escape of medicament and the escape of injection pressure, whereby the medication is immediately and fully applied to the teat canal and forced up into the udder. This manner of injection not only is substantially painless, but substantially eliminates the danger of introducing bacteria into the teat, assures more efficient distribution of medicament, in the teat, and to the udder, and eliminates the need for unsanitary and painful massaging of the teat for effecting distribution of the medicament. The nozzle is equally applicable for use with all livestock, including cattle, swine, sheep, and goats, and the like.

Another object of the invention is the provision of an efficient, rapidly applicable nozzle of the character indicated above, which has a flat entering end, adapted to avoid entrance into the teat, and to merely press inwardly the circle of muscle, at the entrance of the teat, and thereby open up the passage of the teat, and a relatively small diameter bore assuring a high pressure small diameter injection stream.

A further object of the invention is the provision of a self-sealing nozzle of the character indicated above, which has, behind its entering end, a gradiently enlarged diameter portion adapted to serve as a seal in the region of the outer end of the teat canal depressed inwardly by the entering end of the nozzle, followed by a second larger diameter gradiently enlarged portion, for the same purpose, where conditions require.

In the drawings:

FIGURE 1 is a fragmentary schematic view, partly broken away and in section, showing a syringe nozzle of the present invention applied to the entrance and of an animal udder teat;

FIGURE 2 is an enlarged side elevation of the nozzle, per se;

FIGURE 3 is a side elevation of FIGURE 2, taken at right-angles thereto;

FIGURE 4 is a rear end elevation of the nozzle; and,

FIGURE 5 is a longitudinal section, taken on the line 5—5 of FIGURE 2.

Referring in detail to the drawings, the illustrated nozzle 10, is shown attached to the neck 12 of a standard medicament injection syringe 14. The nozzle 10 is adapted to be made in a permanent or reusable form, of metal, such as stainless steel, or in throw-away form, of various suitable plastic materials.

The nozzle 10 is preferably solid and comprises an elongated cylindrical body 16, of a length on the order of ¾ of an inch, formed, from its flat rear end 18, with a forwardly tapered blind bore 20, extending for a major portion of the length of the body, and has a frusto-conical forward end 22. The blind bore 20 is of a diameter and of a length to snugly receive and hold the neck 12 of a standard syringe 14, or other injection device. A coaxial uniform diameter injection bore 24 opens to and extends forwardly from the forward end 22, of the blind bore 20, through the forward end of the nozzle. The diameter of the bore 24 is on the order of .008 of an inch diameter, in order to obtain a relatively high pressure injection of medication in a relatively small diameter concentrated stream, in contrast to the relatively low pressure, large diameter stream obtainable with conventional applicable injection nozzles.

The body 16 has an enlarged rectangular cross section intermediate portion 26, midway between its ends, formed to provide longitudinally extending, concave grooves 28, between longitudinal lands 30, affording adequate finger holes, both for applying the nozzle to a syringe, and for securely and controllably holding and manipulating the nozzle, applying the nozzle to a teat and making an injection. On its rear end, the body 16 has a lateral annular flange 32, formed with diametrically opposed concavities 34, adapted to be used as finger grips, in starting the nozzle onto the neck of a syringe.

Forwardly of the intermediate portion 26, the body 16 is formed with a circular cross section rear, forwardly tapered, smooth seal 36, which, at its rear end, is of substantially the diameter of the intermediate portion 26, and at its forward end, is of substantially half that diameter. The seal 36 has a slightly concaved surface 38.

At its forward end, the rear seal 36 merges, as indicated at 40, into the bulbous, and slightly enlarged diameter rear portion 42, of a forward seal 44. The forward seal 44 is of forwardly tapered and of circular cross section, is smooth, and has a slight longitudinal concave surface 46, and terminates in a flat annular forward end 48, of a diameter on the order of .135 of an inch. a coaxial cylindrical tip 50, of a length on the order of 1⁄64 of an inch, extends forwardly from the end 48, and itself has a flat forward end 52, the tip 50 having a diameter on the order of .095 of an inch.

The diameter of the nozzle tip 50 is such, as indicated in FIGURE 1, that it can relatively freely and shallowly enter the outer end 54 of the canal 56 of an animal udder teat 58, without dilating the same, anymore than needed to act as a pilot for the smaller forward end of the forward seal 44.

In operation, the flat forward end 52, of the tip 50, is centered relative to the outer end of the teat canal and pushed against the muscle ring which surrounds the teat end, and normally is contracted to close the canal, so as to push this ring inwardly, in a manner to spread or dilate the same, without any substantial penetration of the canal, the entrance of the tip 50, in this manner, and to this extent, being only sufficient to enable the forward seal 44 to act as a stopper and a mechanical seal, with the outer end of the canal, to preclude backing up or leaking out of medicament injected, and to prevent loss of injection pressure.

The plunger 60 of a standard syringe 14, is then pushed, or the tube of antibiotic, serving as a syringe, is squeezed, so as to produce the injection of medicament, into and through the teat canal, into the udder.

In the event of the existence of an enlarged diameter teat canal, for whatever reason, the nozzle is adapted to be pressed further, so as to bring the larger diameter rear seal 36 into sealing relation with the outer end of the teat canal.

What is claimed is:

1. A syringe nozzle comprising a body having a rear end, said body being formed with a blind bore opening to said rear end, said blind bore being of a diameter to snugly receive the neck of a syringe, said blind bore having a forward end located intermediate the ends of the body, said body being formed with a coaxial relatively small uniform-diameter injection bore of the order of 0.008 inch in diameter opening to said forward end of the blind bore and to the forward end of said body, and a flat circular tip of the order of 0.135 inch in diameter on the forward end of the body surrounding the injection bore, said tip being shorter in length than the diameter of the tip.

2. A syringe nozzle according to claim 1, wherein said body has an enlarged diameter intermediate portion spaced from the ends of the body, said intermediate portion being formed with circumferentially spaced indented finger holds.

3. A syringe nozzle according to claim 1, wherein said body is formed immediately behind said tip with a circular cross section, rearwardly flaring forward seal, said forward seal having a forward end not substantially larger in diameter than said tip and a rear end larger in diameter than the tip.

4. A syringe nozzle according to claim 1, wherein said body is formed immediately behind said tip with a circular cross section, rearwardly flaring forward seal, said forward seal having a forward end not substantially larger in diameter than said tip and a rear end larger in diameter than the tip, said forward seal having an annular bulbous rear end portion.

5. A syringe nozzle according to claim 1, wherein said body is formed immediately behind said tip with a circular cross section, rearwardly flaring forward seal, said forward seal having a forward end not substantially larger in diameter than said tip and a rear end larger in diameter than the tip, said forward seal having an annular bulbous rear end portion, slightly larger in diameter than the rear end of the forward seal.

6. A syringe nozzle according to claim 1, wherein said body is formed immediately behind said tip with a circular cross section, rearwardly flaring forward seal, said forward seal having a forward end not substantially larger in diameter than said tip and a rear end larger in diameter than the tip, said body having a rear seal extending between the forward seal and said intermediate portion of the body, said rear seal being circular in cross section and rearwardly flared, the forward end of the rear seal being slightly smaller in diameter than the maximum diameter of the forward seal, the rear end of the rear seal being substantially larger in diameter than the forward seal.

7. A syringe nozzle according to claim 1, wherein said body is formed immediately behind said tip with a circular cross section, rearwardly flaring forward seal, said forward seal having a forward end not substantially larger in diameter than said tip and a rear end larger in diameter than the tip, said forward seal having an annular bulbous rear end portion, said body having a rear seal extending between the forward seal and the intermediate portion of the body, said rear seal being annular in cross section and rearwardly flared, the rear end of the rear seal being not substantially smaller in diameter than said intermediate portion of the body, the forward end of the rear seal being smaller in diameter than the bulbous portion of the forward seal.

References Cited

UNITED STATES PATENTS 2,211,537  8/1940  Dickinson _____ 128—221

RICHARD A. GAUDET, *Primary Examiner.*

M. F. MAJESTIC, *Assistant Examiner.*